United States Patent [19]
Hiratsuka

[11] Patent Number: 6,092,221
[45] Date of Patent: Jul. 18, 2000

[54] METHOD FOR CALCULATING REMAINING LIFE OF SEMICONDUCTOR DISK DEVICE

[75] Inventor: Shinji Hiratsuka, Minato-ku, Japan

[73] Assignee: Oki Electric Industry Co., Ltd., Tokyo, Japan

[21] Appl. No.: 09/049,148

[22] Filed: Mar. 27, 1998

[30] Foreign Application Priority Data

Aug. 27, 1997 [JP] Japan ..................................... 9-246180

[51] Int. Cl.[7] .................................................. H02H 3/05
[52] U.S. Cl. ........................................................ 714/47
[58] Field of Search .................................................. 714/47

[56] References Cited

U.S. PATENT DOCUMENTS

| | | | |
|---|---|---|---|
| 5,233,610 | 8/1993 | Nakayama et al. | 714/704 |
| 5,819,100 | 10/1998 | Pearce | 713/323 |
| 5,867,809 | 2/1999 | Soga et al. | 702/130 |

FOREIGN PATENT DOCUMENTS

| | | |
|---|---|---|
| 5-12137 | 1/1993 | Japan . |
| 5-282880 | 10/1993 | Japan . |
| 8-63559 | 3/1996 | Japan . |

*Primary Examiner*—Ly V. Hua
*Attorney, Agent, or Firm*—Jones Volentine, LLP

[57] ABSTRACT

A method for calculating the remaining life of a semiconductor disk device including a step for calculating the number of sectors remained employable in the reserve area, a step for calculating the number of sectors which have been fully employed and the number of sectors which are under employment, the sectors being contained in the reserve area, a step for calculating a ratio of a sum of the number of sectors which have been fully employed and the number of sectors which are under employment and the number of sectors remained employable, and a step for calculating the remaining life of the semiconductor disk device employing the ratio.

6 Claims, 9 Drawing Sheets

F I G. 3

| SECTOR NUMBER | SECTOR FLAG | REPLACEMENT SECTOR NUMBER | NUMBER OF TIMES IN WHICH REVISIONS WERE APPLIED | AREA NAME |
|---|---|---|---|---|
| No. 0000 | UNDER EMPLOYMENT | — | 25860 | USER'S DATA STORAGE AREA |
| No. 0001 | UNDER EMPLOYMENT | — | 1339 | |
| No. 0002 | UNDER EMPLOYMENT | — | 1338 | |
| No. 0003 | UNDER EMPLOYMENT | No. 1000 | 25 | |
| No. 0004 | FAULT (IMPOSSIBLE) | No. 1021 | 0 | |
| No. 0005 | FULL | — | 30000 | |
| .... | .... | .... | .... | |
| No. 0999 | UNDER EMPLOYMENT | — | 25 | |
| No. 1000 | UNDER EMPLOYMENT | — | 9738 | RESERVE AREA EMPLOYABLE FOR REPLACEMENT |
| No. 1001 | UNDER EMPLOYMENT | — | 3387 | |
| .... | .... | .... | .... | |
| No. 1019 | UNDER EMPLOYMENT | — | 26 | |
| No. 1020 | FAULT (IMPOSSIBLE) | — | 0 | |
| No. 1021 | UNDER EMPLOYMENT | — | 119 | |
| No. 1022 | NOT YET EMPLOYED | — | 0 | |
| No. 1023 | NOT YET EMPLOYED | — | 0 | |

F I G. 7 A
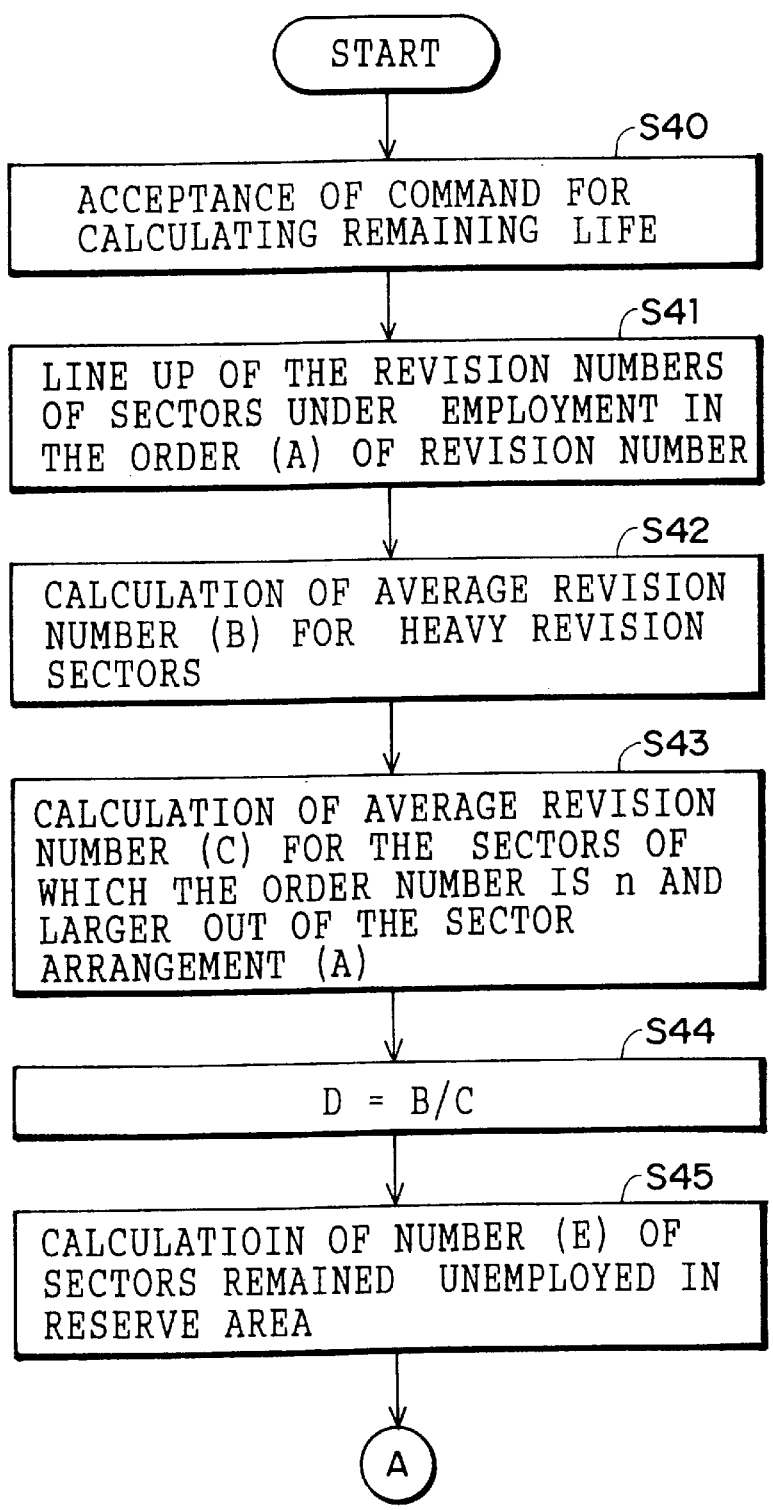

METHOD FOR CALCULATING REMAINING LIFE OF SEMICONDUCTOR DISK DEVICE

FIELD OF THE INVENTION

This invention relates to improvements applicable to a method for calculating the remaining life of a semiconductor disc device. More specifically, this invention relates to improvements applicable to a method for calculating the remaining life of a semiconductor disc device developed to enable discovery of the ratio of the number of the employed sectors and the total number of the sectors, or the remaining number of times in which writing actions are allowed for a sector.

BACKGROUND OF THE INVENTION

A flush memory is limited the total number of times in which writing actions are allowed. As a result, a semiconductor disk device is limited the total number of times in which writing actions are allowed, as well. On an occasion in which an effort is used to write a piece of information in a semiconductor disk device in excess of the allowable maximum times, a writing error readily occurs and the semiconductor disk device becomes incapable of being written a piece of information therein any longer. Accordingly, a semiconductor disk device available in the prior art is to have a use's area and a reserve area in which a piece of information is written in the cases where the user's area is full.

Referring to FIG. 1, a process for writing a piece of information in a semiconductor disk available in the prior art will be described below.

1. Step 301

When a semiconductor disk device receives a write command from a host computer, the semiconductor disk device conducts a process for accepting the write command.

2. Step 302

The semiconductor disk device conducts a process for forwarding a datum from the host computer to the internal data buffer of the semiconductor disk device.

3. Step 303

The controller unit of the semiconductor disk device calculates a sector address of the semiconductor disk device in which the datum is written.

4. Step 304

The controller unit of the semiconductor disk device checks the status of the selected sector in which the datum is scheduled to be written, the selected sector corresponding to the sector address. In other words, a check is conducted to find if the selected sector is a capable sector.

5. Step 305

If the selected sector is determined to be an incapable sector, a replacement sector is calculated out of the reserve area.

6. Step 306

In the case where the selected sector is determined to be a capable sector, or after a replacement sector is selected in the former step, the process goes to the step 306 and the number of times in which data were revised previously for the selected sector or the replacement sector. In other words, a check is conducted to find if the number of times in which revisions were previously conducted is within the allowable extent or not.

7. Step 307

If the number of times in which revisions were previously conducted is in excess of the allowable extent, a process is conducted to register a replacement sector.

8. Step 308

In the case where the number of times in which revisions were previously conducted is within the allowable extent or after a process was conducted to register a replacement sector, a process is conducted to forward datum from the internal data buffer of the semiconductor disk device to the selected sector or the selected replacement sector.

9. Step 309

The number of the sector administration table, the number showing the number of times in which data were previously revised, is revised.

10. Step 310

A check is conducted to determine if the foregoing steps were repeated for times corresponding to the number of sectors directed by the host computer. The foregoing steps are repeated for times corresponding to the number of sectors directed by the host computer. When the foregoing steps have been repeated for times corresponding to the number of sectors directed by the host computer, the process goes to normal completion.

Even in the cases where the foregoing process for writing a piece of information in a semiconductor disk available in the prior art is employed, situation is same after all the reserve areas have been employed. In other words, on an occasion in which an effect is used to write a piece of information in a semiconductor disk device after all the reserve areas have been employed, a writing error readily occurs and the semiconductor disk device becomes incapable of being written a piece of information therein any longer. In this event, since a user does not have a means to previously know the life of a semiconductor disk device, such an incident suddenly occurs to cause a serious problem to keep security of data.

An improved concept is known in the prior art that in case where the number of times in which writing actions were previously conducted for a semiconductor disk device has exceeded a predetermined number or a type of threshold value, a waning signal is issued. Even if this improved concept is realized, no users are allowed to know the instant position until the number of times in which writing actions were previously conducted for a semiconductor disk device arrives at the predetermined number or the threshold value. Incidentally, since the users can not know how long or how many times he will be allowed to do writing actions for the semiconductor disk device after he is given the warning signal, the improved concept is still unsatisfactory to secure security of the data, because the improved concept is not necessarily user friendly.

OBJECTS AND SUMMARY OF THE INVENTION

The object of this invention is to provide methods for calculating the remaining life of a semiconductor disk device.

To achieve the foregoing object, a method for calculating the remaining life of a semiconductor disk device in accordance with a first embodiment of this invention comprises:

a step for calculating the number of sectors remained employable in a reserve area, a step for calculating the number of sectors which have been fully employed and the number of sectors which are under employment, the sectors being contained in the reserve area, a step for calculating a ratio of a sum of the number of sectors which have been fully employed and the number of sectors which are under employment and the number of sectors remained employable, and a step for calculating the remaining life of the semiconductor disk device employing the ratio.

The method for calculating the remaining life of a semiconductor disk device is based on a concept that the ratio by which the memory area has been employed can be represented by a ratio of the number of sectors remained employable in a reserve area and the number of sectors which have been fully employed and the number of sectors which are under employment. The sectors which can not be employed are excluded from the number of the employable sectors.

As a result, a user is allowed to know a ratio by which the memory area has been employed at an arbitrary time, and he is allowed to know the extent a memory has been employed so far.

To achieve the foregoing object, a method for calculating the remaining life of a semiconductor disk device in accordance with a second embodiment of this invention comprises:

a step for calculating the number of sectors remained employable in a reserve area, a step for lining up the entire sectors identified as under employment out of the sectors contained in the user's data storage, in the order of revisions previously applied thereto, for producing a sector arrangement, a step for selecting a sector of which the order number is a sum of the number of sectors remained employable in the reserve area and one (1), from the sector arrangement, a step for calculating the number of revisions of the sector of which the order number is a sum of the number of sectors remained employable in the reserve area and one (1), and a step for subtracting the number of revisions of the sector of which the order number is a sum of the number of sectors remained employable in the reserve area and one (1) from the number of allowable number of revisions, for predicting the remaining life of the semiconductor disk device.

The method for calculating the remaining life of a semiconductor disk device in accordance with a second embodiment of this invention is based on a premise that replacement occurs from seniority of the number in which revisions were previously applied. In other words, a sector having a larger number in the number in which the sector was previously applied revisions, is assumed to be replaced earlier. Thus, the number of revisions is calculated for a sector of which the order number in revision number is the number of sectors remained employable in a reserve area plus one (1). On the assumption that an excess of this revision number means an arrival to the life, the remaining number of allowable revisions is calculated to predict the life of a sector. This allows a more precise prediction.

To achieve the foregoing object, a method for calculating the remaining life of a semiconductor disk device in accordance with a third embodiment of this invention comprises:

a step for selecting the top n sectors from the sector arrangement and for identifying each sector contained in the top n sectors as a heavy revision sector, a step for calculating the average revision number of the heavy revision sectors, a step for selecting the sectors of which the revision number is (n+1) and larger and for identifying each sector contained in the sectors of which the revision number is (n+1) and larger as an ordinary sector, a step for calculating the average revision number of the ordinary sectors, a step for calculating a ratio of the average revision number of the heavy revision sectors and the average revision number of the ordinary sectors, a step for calculating the number of sectors remains employable in the reserve area, a step for approving an idea that a limitation for revision will be reached by replacement of the ordinary sector, in the case where the number of sectors remains employable in the reserve area is identical to or larger than a product of the ratio and n, and for approving an idea that a limitation for revision will be reached by replacement of the heavy revision sector, in the case where the number of sectors remains employable in the reserve area is less than a product of the ratio and n, a step for subtracting the revision number of the ordinary sector from which a replacement to the reserve area will be impossible from the maximum allowable number of revisions, for predicting the remaining number for allowable revisions within the life of the semiconductor disk device, in the case where the idea that a limitation for revision will be reached by replacement of the ordinary sector have been approved, a step for calculating a ratio in which replacement is allowable by conducting a calculation employing a formula:

(Number of sectors remained employable in the reserve area)/{The ratio (D) of the average revision number (B) of the top n sectors of the sector arrangement (A) and the average revision number (C) of the remaining sectors or the entire sectors removed by the top n sectors×n}, in the case where the idea that a limitation for revision will be reached by replacement of the number of sectors remains employable in the reserve area have been approved, and a step for subtracting the number of revisions applied to a sector of which the order number is (n+1) from a product of the maximum allowable number of revisions and the ratio (I) in which replacement is allowable, for predicting the remaining number for allowable revisions within the life of the semiconductor disk device.

The method for calculating the remaining life of a semiconductor disk device in accordance with a third embodiment of this invention is based on a concept that the number of revisions which were applied so far to a sector can be a basis to predict the further potential replacement. Based on this concept, the remaining life is shown in terms of a remaining number of revisions. Therefore, a prediction of a remaining life is allowed, regardless of difference of a system employed.

In any of the foregoing embodiments, the method for calculating the remaining life of a semiconductor disk device can be added a step for checking if the revision number has exceeded the upper limit, in response to receipt of a write command issued by a host computer and for setting a warning flag, and a step for checking if a warning flag has been set and for informing the host computer of the warning status.

BRIEF DESCRIPTION OF THE DRAWINGS

This invention, together with its various features and advantages, can be readily understood from the following more detailed description presented in conjunction with the foregoing drawings, in which:

FIG. 3 is an example of a sector administration table to be employed for conducting methods for calculating the remaining life of a semiconductor disk device in accordance with this invention, FIGS. 7A and 7B are a flow chart of a process for calculating the remaining life of a semiconductor disk device, the remaining life being shown in terms of the remaining number of revisions allowable for a sector within the life.

DETAILED DESCRIPTION OF THE PREFERRED EMBODIMENTS

First of all, a brief description will be presented below for a semiconductor disk device.

Figure 2:
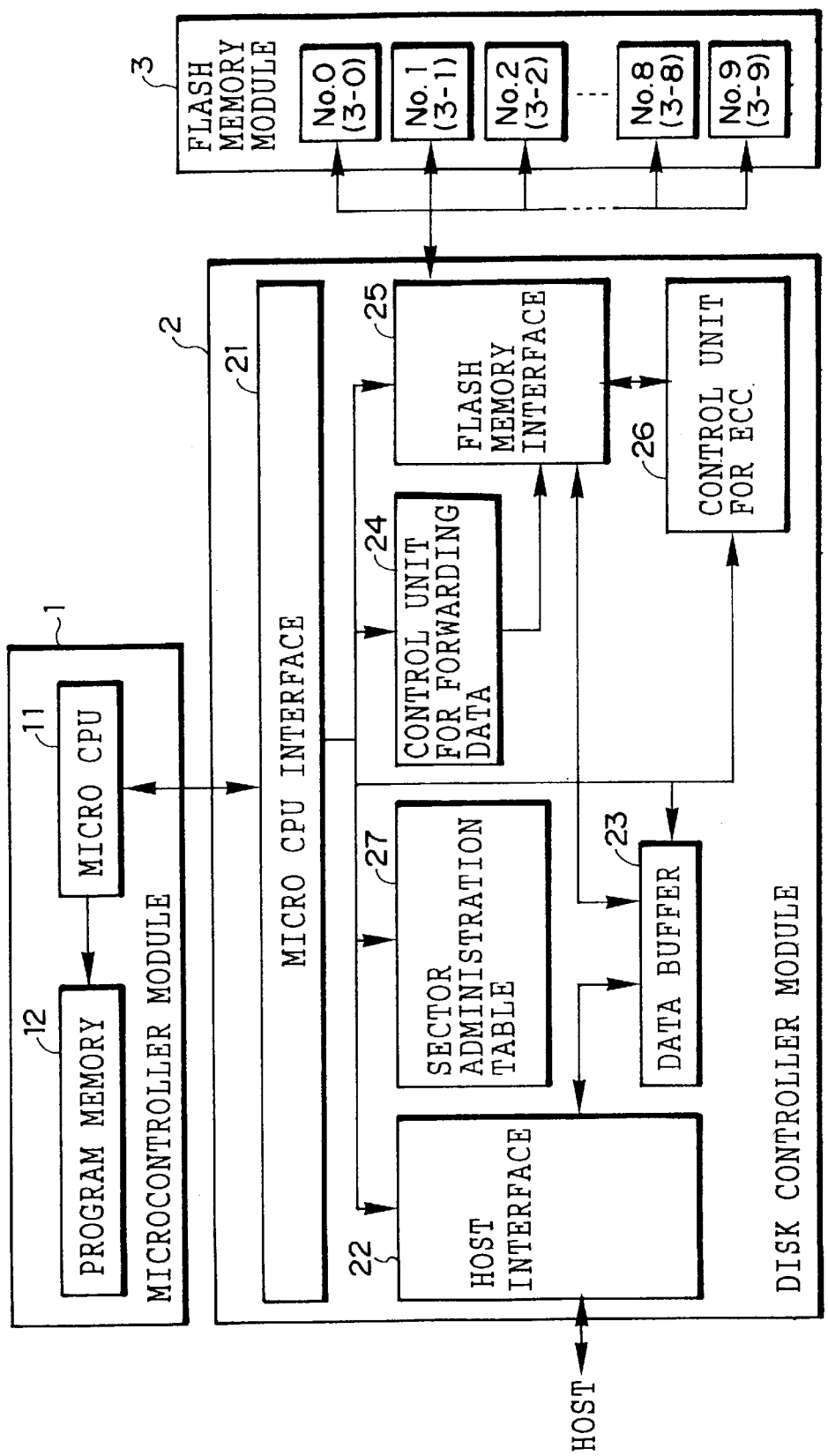
FIG. 2 is a schematic drawing illustrating a semiconductor disk device to be employed for conducting methods for calculating the remaining life of a semiconductor disk device in accordance with this invention.

Referring to FIG. 2, a semiconductor disk device is composed of a microcontroller module (1), a disk controller module (2) and a flush memory module (3). The microcontroller module (1) has a function to coordinate the entire control of the semiconductor disk device. The disk controller module (2) has a function to control the flush memory module (3) following the command issued by the microcontroller nodule (1). The flush memory module (3) is composed of a plurality of flush memory chips Nos. 0 (3-0) through 9 (3-9).

The microcontroller module (1) is composed of a micro CPU (11) and a program memory (12), and works to allow a host computer to control a semiconductor disk device in a manner similar to that which is employed to control a magnetic disk device et al. The micro CPU (11) is a control processor unit for controlling the microcontroller module (1). The program memory (12) is a firmware for storing a program et al. for the control.

The disk controller module (2) is composed of a micro CPU interface (21), a host interface (22), a data buffer (23), a control unit for forwarding data (24), a flush memory interface (25), a control unit for ECC (26) and a sector administration table (27).

The micro CPU interface (21) is an interface for connecting the disk controller module (2) and the micro CPU (11) of the micro controller module (1). The host interface (22) is an interface for connecting the disk controller module (2) and a host computer (not shown), and all the commands issued by the host computer and all the data sent from the host computer are received therethrough. The data buffer (23) is a buffer memory which temporarily stores the write data read from the host computer and/or the read data read from the flush memory module (3). The control unit for forwarding data (24) controls the function for forwarding data between the data buffer (23) and the flush memory module (3). The flush memory interface (25) is an interface connecting the disk controller module (2) and the flush memory module (3). The control unit for ECC (26) conducts calculation for correcting errors contained in the data written in the memory. The sector administration table (27) is a table employable for conducting the sector administration of the flush memory module (3).

Secondly, a brief description will be presented below for a sector administration table.

Referring to FIG. 3, a sector administration table has columns for showing sector numbers, sector flags, replacement sector numbers, number of times in which revisions were applied and area names. A sector flag distinguishes a sector which is currently employed from a sector which is not currently employed including fault sectors and sectors of which the description area is full. A replacement sector number indicates the number of a sector which is employed to replace a sector which is not employable. A number of revision times shows the number of times in which revisions were conducted so far. An area name distinguishes a storage area in which user's data are stored from a reserve area which is scheduled to be employed to replace a sector which is not employable.

FIRST EMBODIMENT

A method for calculating the remaining life of a semiconductor disk device including a step for calculating the employment ratio defined as a ratio of the number of sectors presently under employment and the total number of the employable sectors.

Figure 4A:
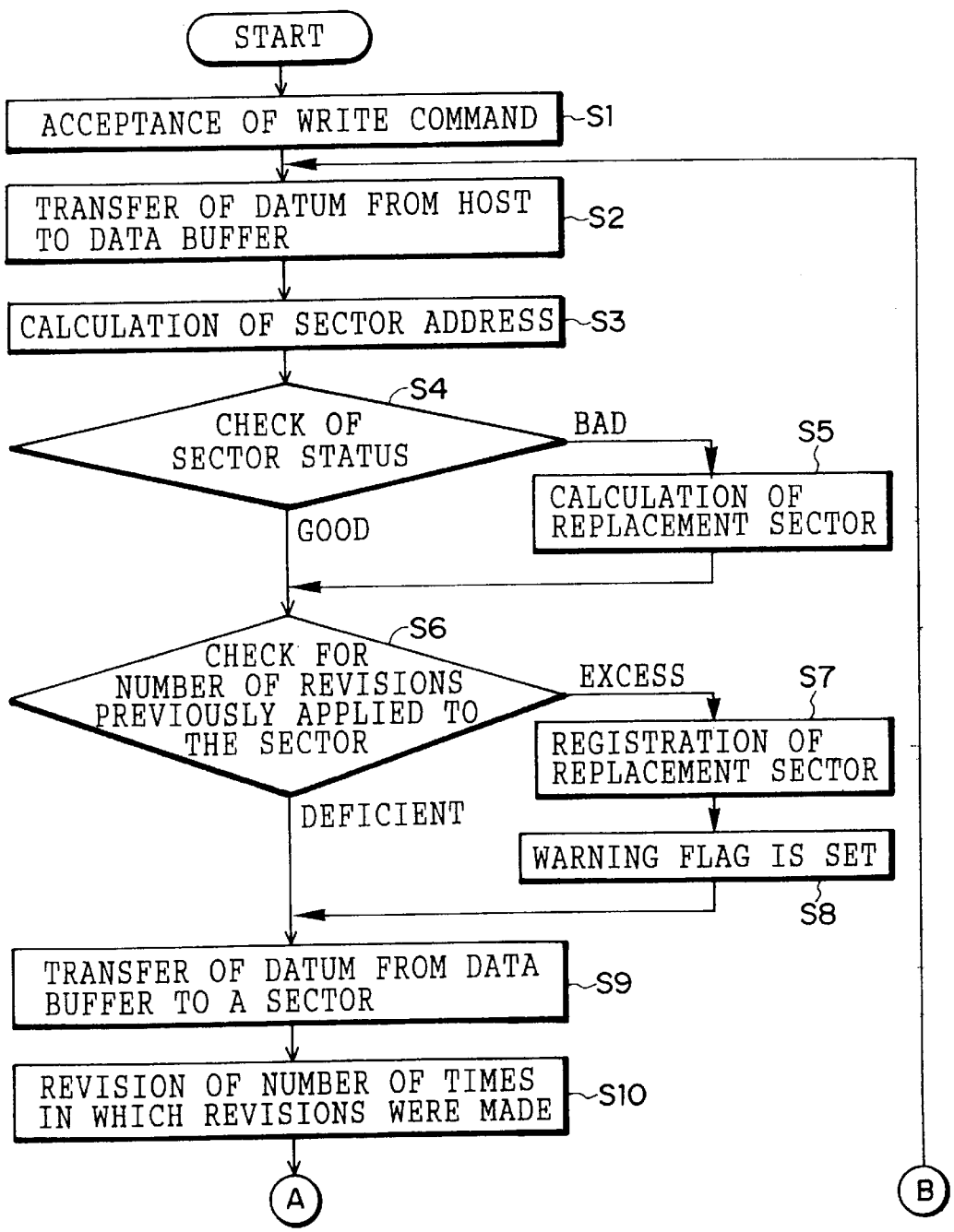
FIGS. 4A and 4B are a flow chart of a process for writing a piece of information in a semiconductor disk in accordance with this invention.
Figure 4B:
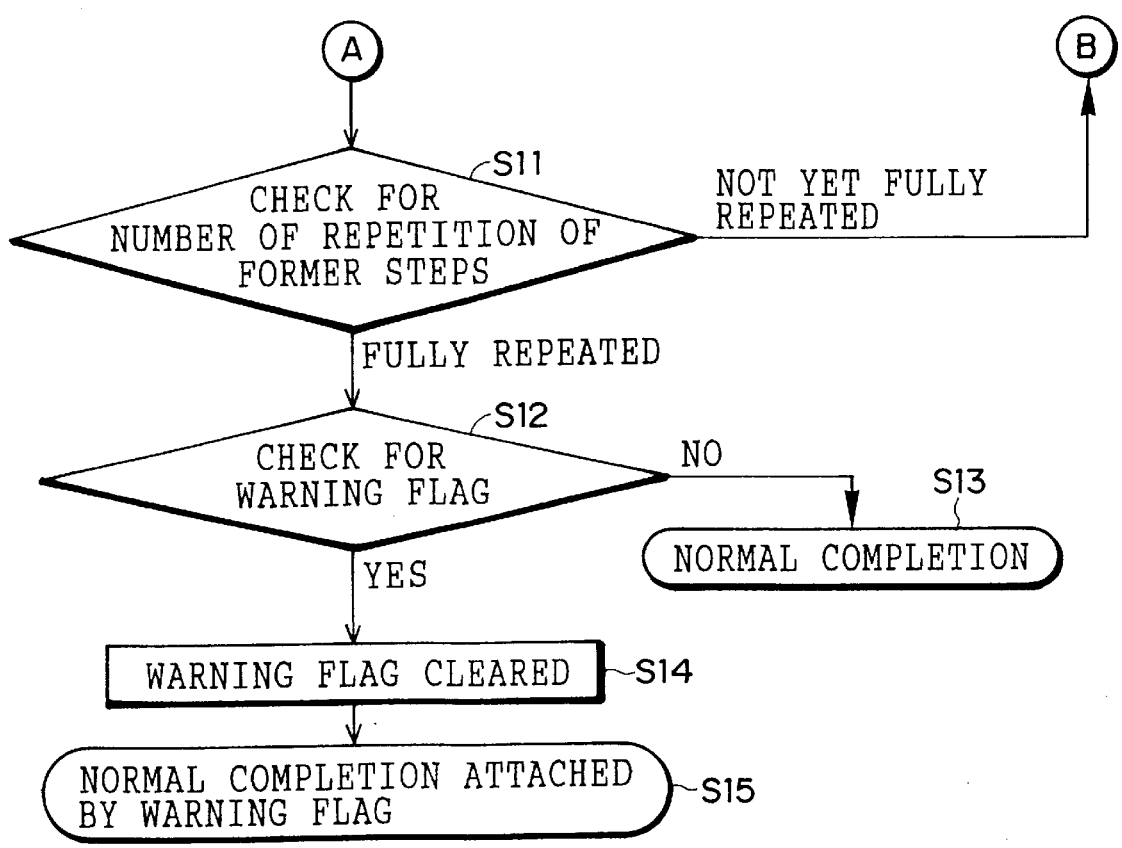
Figure 5:
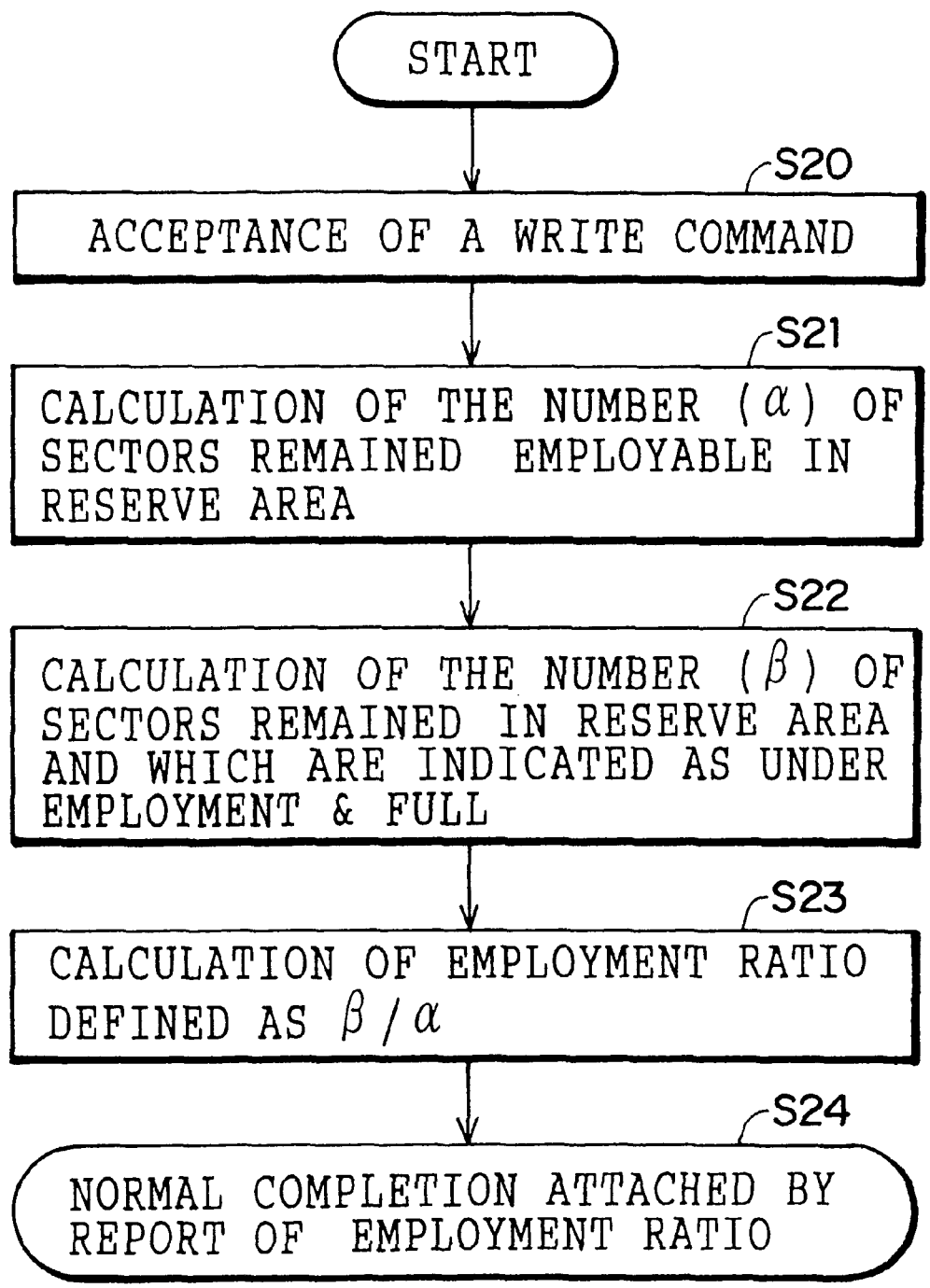
FIG. 5 is a flow chart of a process for calculating the remaining life of a sector in accordance with the first embodiment of this invention.

Referring to FIGS. 4A, 4B and 5, a process for calculating the remaining life of a semiconductor disk device in accordance with the first embodiment of this invention will be described below.

Referring to FIGS. 4A and 4B, a process for writing a piece of information in a semiconductor disk in accordance with the first embodiment of this invention will be described below.

1. Step S1

When a semiconductor disk device receives a write command from a host computer, the semiconductor disk device conducts a process for accepting the write command.

2. Step S2

The semiconductor disk device conducts a process for forwarding a datum from the host computer to the internal data buffer of the semiconductor disk device.

3. Step S3

The controller unit of the semiconductor disk device calculates a sector address of the semiconductor disk device in which the datum is written.

4. Step S4

The controller unit of the semiconductor disk device checks the status of the selected sector in which the datum is scheduled to be written, the selected sector corresponding to the sector address. In other words, a check is conducted to find if the selected sector is a capable sector.

5. Step S5

If the selected sector is determined to be an incapable sector, a replacement sector is calculated out of the reserve area.

6. Step S6

In the case where the selected sector is determined to be a capable sector, or after a replacement sector is selected in the former step, the process goes to the step 306 and the number of times in which data were revised previously for the selected sector or the replacement sector. In other words, a check is conducted to find if the number of times in which revisions were previously conducted is within the allowable extent or not.

7. Step S7

If the number of times in which revisions were previously conducted is in excess of the allowable extent, a process is conducted to register a replacement sector.

8. Step S8

After a replacement sector is registered, a warning flag is set to show that the number of times in which revisions were previously conducted for the sector is in excess of the allowable extent.

9. Step S9

In the case where the number of times in which revisions were previously conducted is within the allowable extent or after a process was conducted to register a replacement sector, a process is conducted to forward datum from the internal data buffer of the semiconductor disk device to the selected sector or the selected replacement sector.

10. Step S10

The number of the sector administration table, the number showing the number of times in which data were previously revised, is revised.

11. Step S11

A check is conducted to determine if the foregoing steps were repeated for times corresponding to the number of sectors directed by the host computer. The foregoing steps are repeated for times corresponding to the number of sectors directed by the host computer. When the foregoing steps have been repeated for times corresponding to the number of sectors directed by the host computer, the process goes to normal completion.

12. Step S12

A check is conducted if a warning flag is set for the sector.

13. Step S13

If no warning flag has been set for the sector, the process goes to normal completion.

14. Step S14

If a warning flag has been set for the sector, the warning flag is cleared.

15. Step S15

The process goes to normal completion, but a piece of information is given toward the host computer, to inform that the completion status is attached by a warning flag.

Figure 1:
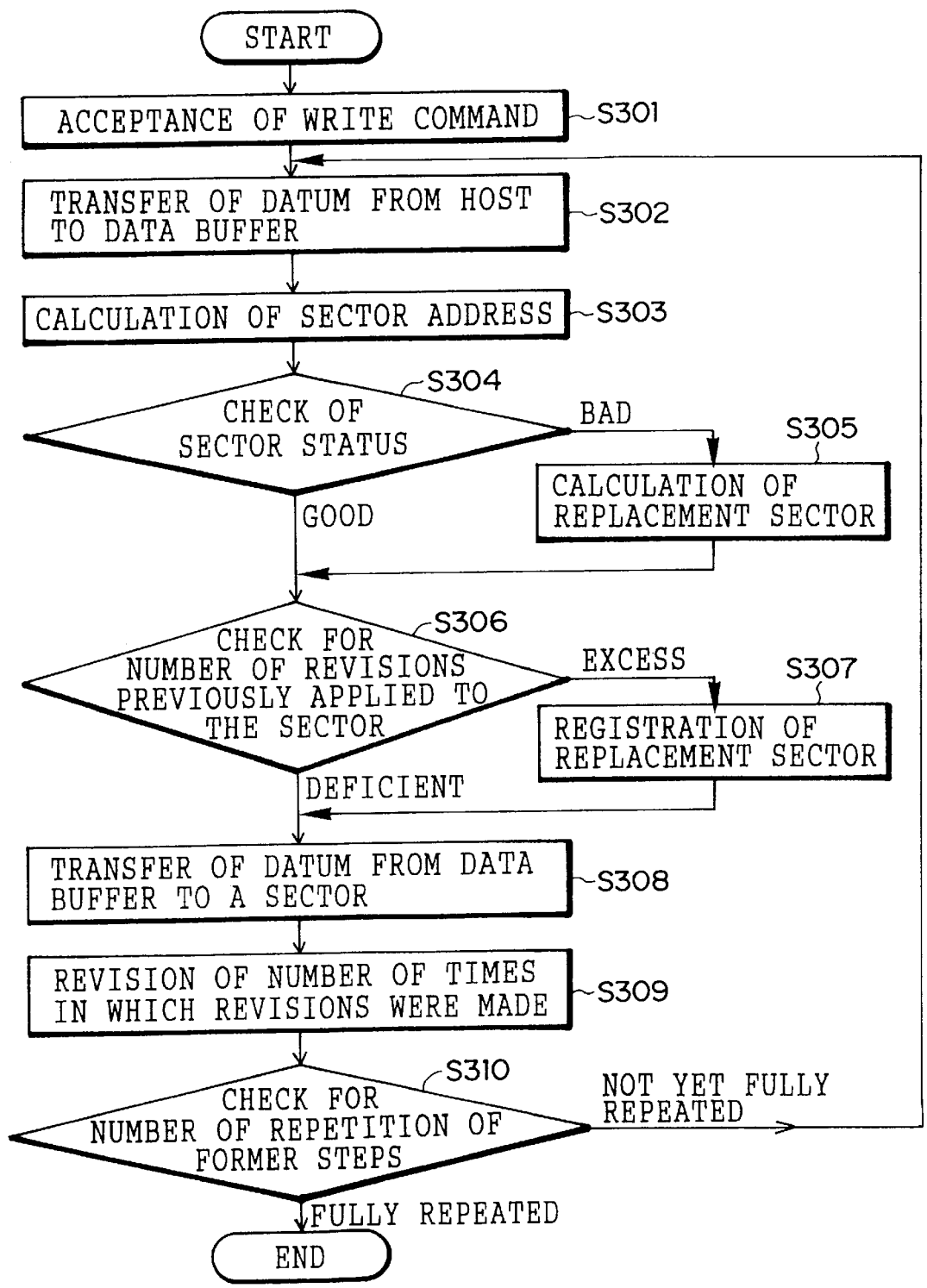
FIG. 1 is a flow chart showing a process for writing a piece of information in a semiconductor disk available in the prior art.

The difference from the process for writing a piece of information available in the prior art and which was described, referring to FIG. 1 is summarized below.

If the number of times in which revisions were previously conducted is in excess of the allowable extent, a warning flag is set, in addition to that a replacement sector is registered. The process for setting a warning flag is conducted by the program memory (12). After writing processes have been repeated for times directed by the host computer, a check is conducted if a warning flag has been set, and if a warning flag has been set, the waning flag is cleared and the status in which a warning flag has been set is reported to the host computer.

Referring to FIG. 5, a process for calculating the remaining life of a sector will be described below.

1. Step S20

When a host computer issues a command for calculating the remaining life of a semiconductor disk device, a semiconductor disk device receives the command through the host interface (22) and recognizes the command and accepts the command.

2. Step S21

The total number ($\alpha$) of the sectors remained employable in the reserve area is calculated. More specifically, the micro controller module (1) counts the number of sectors remained employable in the reserve area and which are attached by a sector flag column indicating that the sector is under employment, the sector is full or the sector is not yet employed, out of the sector administration table.

3. Step S22

The total number ($\beta$) of the sectors remained in the reserve area and which are attached by a sector flag column indicating that the sector is under employment and the sector is full, is calculated. This process can be conducted in a manner similar to that which was employed for the step S21.

4. Step S23

The total number of the employable sectors ($\alpha$) is divided by the total number ($\beta$) of the sectors remained in the reserve area and which are attached by a sector flag column indicating that the sector is under employment and the sector is full, to obtain the employment ratio.

For example, the employment ratio of the sectors shown in the sector administration table illustrated in FIG. 3 is calculated as follows:

i. The number of the employable sectors remained in the reserve area ($\alpha$) is 6, ii. The number of the sectors remained in the reserve area and which are indicated as under employment and the sectors which were full ($\beta$) is 4, and iii. The employment ratio is:

$$(4/6) \times 100 = 66.7\%.$$

5. Step S24

The process goes to a normal completion attached by reporting of the employment ratio of a sector.

As a result, a user is allowed to enjoy an advantage in which he can know the present employment ratio of a sector contained in a semiconductor disk device at an arbitrary time. Accordingly, he can suspend employment of a semiconductor disk device at a point of time when the employment ratio has increased up to e.g. 85% to avoid sudden possibilities in which the semiconductor disk device becomes incapable of employment due to over employment thereof.

The foregoing description has clarified that the first embodiment of this invention has successfully provided a method for calculating the remaining life of a semiconductor disk device, which includes a step to set a warning flag, when the number of times in which revisions were previously conducted has exceeded the allowable extent, a step for reporting the status in which a warning flag is set, when a normal completion of a process is reported to a host computer, a step for calculating the employment ratio defined as a ratio of a sum of the number of the sectors under employment and the sectors which are full and the total number of the employable sectors, and a step for reporting the employment ratio to a host computer, when a process goes to an normal completion.

SECOND EMBODIMENT

A method for calculating the remaining life of a semiconductor disk device including a step for calculating the remaining life of a sector, the remaining life being shown in terms of the remaining number of times in which revisions will be allowed for a sector.

Figure 6:
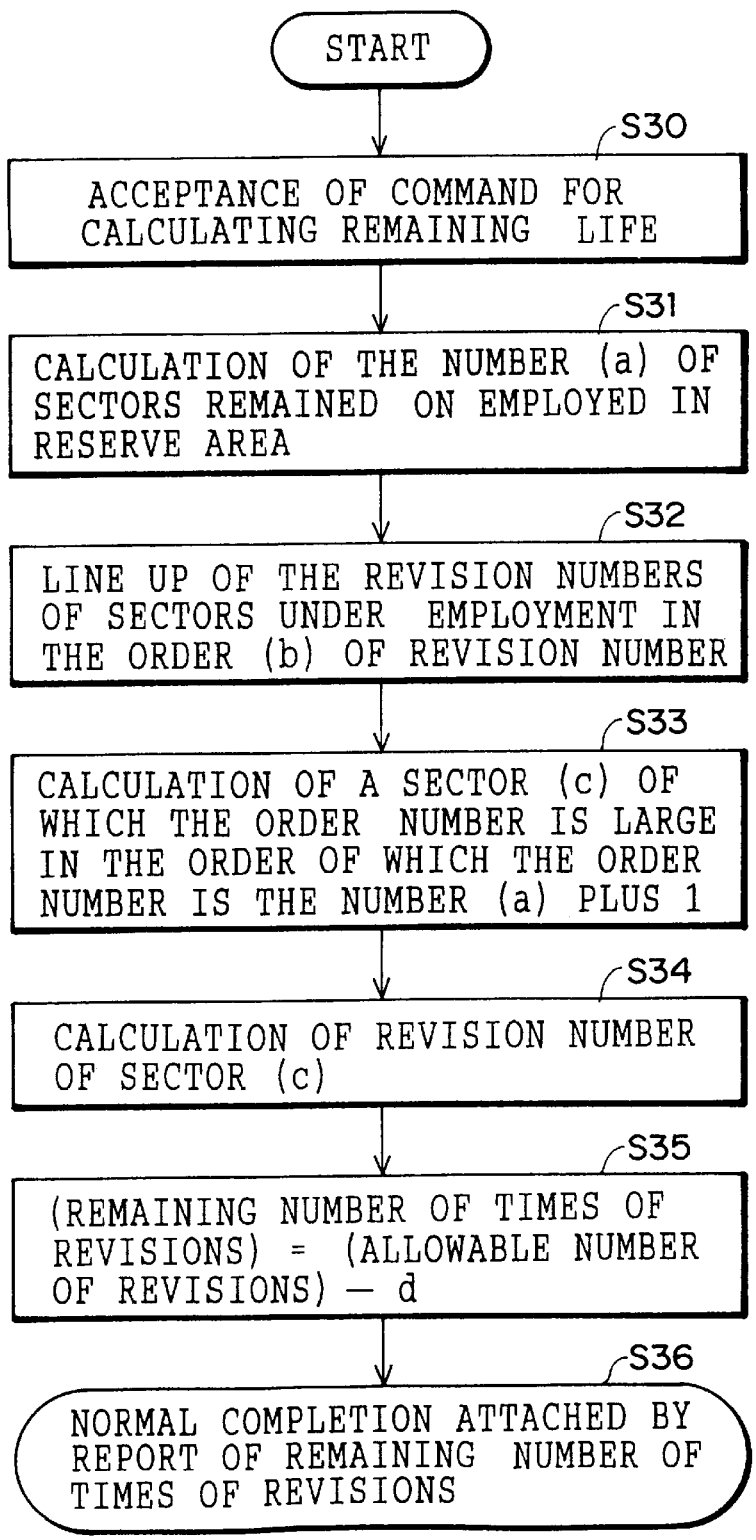
FIG. 6 is a flow chart of a process for calculating the remaining life of a semiconductor disk device, the remaining life being shown in terms of the remaining number of times in which revisions will be allowed for a sector.

Referring to FIGS. 4A, 4B and 6, a process for calculating the remaining life of a semiconductor disk device in accordance with the second embodiment of this invention will be described below.

A process for writing a piece of information in a semiconductor disk which process is entirely identical to that for the first embodiment of this invention described earlier referring to FIGS. 4A and 4B, is conducted.

Referring to FIG. 6, a process for calculating the remaining life of a sector, the remaining life being shown in terms of the remaining number of times in which revisions will be allowed for a sector, will be described below.

1. Step S30

When a host computer issues a command for calculating the remaining life of a semiconductor disk device, a semiconductor disk device recognizes the command and accepts the command.

2. Step S31

A calculation is conducted to calculate the number of the sectors (a) remained unemployed in the reserve area. More specifically, the number of the sectors in the reserve area and which are attached by a sector flag column indicating that the sector is not yet employed, out of the sector administration table.

3. Step S32

The revision numbers of all the sectors under employment and which are contained in the user's area and the reserve area are lined up in the order (b) of the revision numbers in which order the former sectors have a larger number of revisions. More specifically, the numbers of revisions are read out of the sector administration table for all the sectors attached by a sector flag column indicating that the sector is under employment, and all the sectors are memorized in the program memory (12) in the order of the revision numbers.

4. Step S33

An assumption is made that replacement to the sectors (a) remained unemployed in the reserve area which sectors were found in the step S31, will happen in the order (b) of revision numbers calculated in the step S32. Based on this assumption, a calculation is conducted to find a sector (c) which will not be able to be replaced or a sector (c) which has a revision number which is large in the order of which the order number is a sum of the number (a) of the sectors which are not yet employed and one (1). The sector (c) is named a sector which can not be replaced.

5. Step S34

A calculation is conducted to obtain the number of revisions (d) of the sector (c) which can not be replaced, the sector (c) having been found in the step S34.

6. Step S35

On the assumption that the time at which the revision number of the sector (c) which can not be replaced exceeds a limit, is the end of the life of a sector, the remaining number of times in which revision will be allowed for a sector is calculated, employing a formula:

(Remaining number of times in which revision will be allowed for a sector)=(Maximum allowable number of revisions)−(The revision number of the sector of which the order number is the number of the unemployed sectors+1).

7. Step S36

The process goes to a normal completion, and the remaining number of times in which revision will be allowed for a sector is informed to the host computer.

As was described above, this embodiment is based on a concept that the revision number at which a sector becomes impossible to be replaced is the end of the life.

For example, the remaining number in which revision will be allowed for sectors of which the particulars are shown in the sector administration table illustrated in FIG. 3 is calculated as follows:

i. The number (a) of the sectors remained unemployed in the reserve area is 2, ii. The number (c) of the sector which will not be able to be replaced is No. 1001.

iii. The revision number (the number in which the sector received revisions so far) (d) of the sector which will not be able to be replaced or the sector having the number, No. 1001, is 3387.

iv. The remaining number in which revision will be assumed for the sector is:

$$30000-3387=26613,$$

wherein the maximum allowable number for revision is assumed to be 30000.

As a result, a user is allowed to enjoy an advantage in which he can know the remaining life of a sector shown in terms of the remaining member of times in which revisions will be allowed for a sector.

The foregoing description has clarified that the second embodiment of this invention has successfully provided a method for calculating the remaining life of a semiconductor disk device, which includes a step for calculating the remaining life of a sector shown in terms of the remaining number of times in which revisions will be allowed for a sector.

THIRD EMBODIMENT

A method for calculating the remaining life of a semiconductor disk device including a step for predicting the remaining number of revisions allowable for a sector within the life thereof.

Referring to FIGS. 4A, 4B, 7A and 7B, a process for calculating the remaining life of a semiconductor disk device in accordance with the third embodiment of this invention will be described below.

A process for writing a piece of information in a semiconductor disk which process is entirely identical to that for the first embodiment of this invention described earlier referring to FIGS. 4A and 4B, is conducted.

Figure 7B:
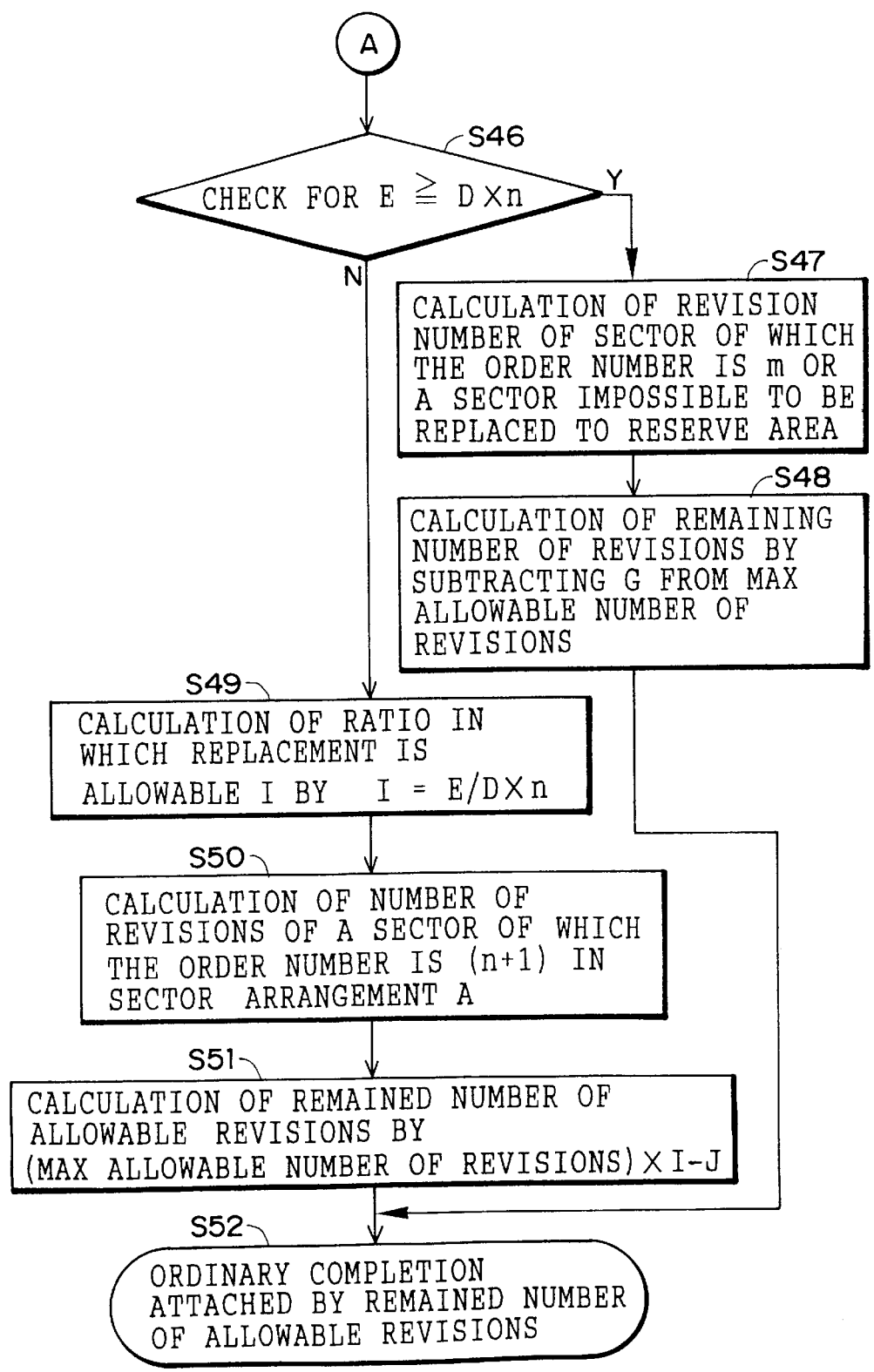

Referring to FIGS. 7A and 7B, a process for calculating the remaining life will be described below.

1. Step S40

When a host computer issues a command for calculating the remaining life of a semiconductor disk, a semiconductor disk device recognizes the command and accepts the command.

2. Step S41

All the sectors included in the use's area and the reserve area and which sectors are presently under employment are lined up in the order (A) of the revision number or the number in which revisions were conducted so far for the sector. The order (A) will be referred to as a sector arrangement (A) hereinafter. More specifically, the revision numbers of all the sectors indicated as under employment in the sector flag column, are picked up from the sector administration table, and are memorized in the program memory (12) in the order of the revisions. During this process, the sum of the revision numbers for a replacement sector and the original sector thereof is assumed to be the revision number of the combination of the sectors, because a host computer recognizes a combination of an original sector and the replacement sector composes one sector. For example, since the replacement sector column of the sector administration table illustrated in FIG. 3, shows No. 1021 as the replacement sector of the sector No. 0005, a combination of the sectors 0005 and 1021 is assumed to be one sector having the revision number of 30119, in the later steps.

3. Step S42 n sectors are picked up from the top of the sector arrangement (A) produced in the former step, and are named heavy revision sectors. The average revision number (B) is calculated for the heavy revision sectors. The foregoing number "n" is aimed to designate the number of sectors for which revisions are heavy. Thus, the foregoing number "n" is preferably decided system by system in accordance with a command issued by a host computer, although it can be decided based on evaluation of a firmware.

4. Step S43

A calculation is conducted for obtaining an average revision number (C) of the remaining sectors or a entire sectors removed by the top n sectors. In other words, the average revision number (C) is calculated for the sectors having the order number of (n+1) and larger out of the sector arrangement (A).

5. Step S44

The ratio (D) of the average revision number (B) of the top n sectors of the sector arrangement (A) and the average revision number (C) of the remaining sectors or a entire sectors removed by the top n sectors is calculated employing a formula:

(The ratio (D) of the average revision number (B) of the top n sectors of the sector arrangement (A) and the average revision number (C) of the remaining sectors or a entire sectors removed by the top n sectors)=(The average revision number (B) of the top n sectors of the sectors of the sector arrangement (A))/(The average revision number (C) of the remaining sectors of the entire sectors removed by the top n sectors).

The ratio (D) of the average revision number (B) of the top n sectors of the sector arrangement (A) and the average revision number (C) of the remaining sectors or the entire sectors removed by the top n sectors, indicates the number of revisions applied to the heavy revision sectors so far for one revision applied to the ordinary sectors, and implies the corresponding potential ratio assumed in the future process.

6. Step S45

A calculation is conducted to obtain the number (E) of the sectors remained unemployed in the reserve area. More specifically, the number of sectors for which the sector flag column indicates as "not yet employed" are summed up from the sector administration table.

7. Step S46

A check is conducted to determine if a replacement of an ordinary sector will cause a further replacement to be impossible or a replacement of a heavy revision sector will cause a further replacement to be impossible. On the assumption that the number of replacement to be conducted by a heavy revision sector is more than the corresponding number of an ordinary sector by the ratio (D) of the average revision number (B) of the top n sectors of the sector arrangement (A) and the average revision number (C) of the remaining sectors or the entire sectors removed by the top n sectors, if the number of the sectors (E) remained unemployed in the reserve area exceeds the product of the ratio (D) of the average revision number (B) of the top n sectors of the sector arrangement (A) and the average revision number (C) of the remaining sectors or the entire sectors removed by the top n sectors and the number "n", or if $E \geq D \times n$, a replacement of an ordinary sector is determined to cause an overflow or to cause a limit to be reached, and a process goes to the step S47.

8. Step S47

When a replacement of an ordinary sector caused a limit to have been reached, the revision number (G) of an ordinary sector of which the order number is "m" and which is impossible to be replaced by one sector of the reserve area is calculated.

9. Step S48

A calculation is conducted to reduce the revision number (G) of an ordinary sector of which the order number is "m" and which is impossible to be replaced by one sector of the reserve area from the maximum allowable number of revisions. A result of this calculation is assumed to represent the remaining number of revisions allowable within the life of the sector, and is informed to the host computer.

10. Step S49

When the number (E) of the sectors remained unemployed in the reserve area is less than the product of the ratio (D) of the average revision number (B) of the top n sectors of the sector arrangement (A) and the average revision number (C) of the remaining sectors or the entire sectors removed by the top n sectors, or when $E<D \times n$, the next replacement is assumed to be caused by a replacement of a heavy revision sector, and the process goes to the step S49. A calculation is conducted to obtain a ratio (I) in which replacement is allowable by the following formula:

(The ratio (I) in which replacement is allowable)=(The number (E) of the sectors remained unemployed in the reserve area)/(The product of the ratio (D) of the average revision number (B) of the top n sectors of the sector arrangement (A) and the average revision number (C) of the remaining sectors or the entire sectors removed by the top n sectors).

A result of this calculation enables calculation of a ratio to which the remaining number of allowable revisions of ordinary sectors is reduced, by a limit applicable to replacement of heavy revision sectors.

11. Step S50

A calculation is conducted to obtain the number of revisions (J) of a sector of which the order number is (n+1) and which is included in the sector arrangement (A).

12. Step S51

The number of revisions (J) of a sector of which the order number is (n+1) in the sector arrangement (A) is subtracted from the product of the maximum number of allowable revisions and the ratio (I) in which replacement is allowable. A product of the maximum number of allowable revisions and the ratio (I) in which replacement is allowable represents the number by which a sector of which the order number is (n+1) is allowed to be employed out of the maximum number of the revisions allowable for the sector. A difference between the product of the maximum number of allowable revisions and the ratio (I) in which replacement is allowable and the number of revisions (J) of a sector of which the order number is (n+1) in the sector arrangement (A) represents the number of the remaining revisions allowable for a sector of which the order number is (n+1) within the life thereof.

13. Step S52

The number of the remaining revisions allowable for a sector of which the order number is (n+1) within the life thereof, is informed to the host computer, when the process goes to a normal completion.

For example, the number of the remaining revisions allowable for a sector of which the order number is (n+1) within the life thereof, is calculated as follows for sectors of which the particulars are shown in the sector administration table illustrated in FIG. 3:

i. Assuming that "n" is 3, the average revision number (B) for the top n (3) heavy revision sectors is:

$$B=(30119+25869+9738)/3=21905.7$$

ii. The average revision number (C) for the entire sectors removed by the top n sectors is:

$$C=(1339+1338+25+25+3387+26)/6=1023.3$$

iii. The ratio (D) of the average revision number (B) of the top n sectors and the average revision number (C) of the entire sectors removed by the top n sectors is:

$$D=21905.7/1023.3=21.4$$

iv. The number (E) of the sectors remained unemployed in the reserve area is assumed to be 20.

v. The number of the replaceable sectors 20 is less than D or 21.4.

vi. The ratio (I) in which replacement is allowable is:

$$I=20/(21.4\times3)=0.31$$

vii. The number of revisions conducted for the top (n+1) sectors is 3387.

viii. Assuming the maximum number of the allowable revisions for a sector is 30000, the number of the remaining revisions allowable for a sector of which the order number is (n+1) within the life thereof is:

$$(30000\times0.31)-3387=5913$$

On the other hand, the calculation for the case where a limit is reached by replacement of an ordinary sector will be described below:

i. The number (E) of the sectors remained unemployed in the reserve area is assumed to be 111.

ii. The number of the replaceable sectors 111 is more than (21.4×3).

iii. The number of sectors remained unemployed in the reserve area, after (n+1) sectors are replaced is:

$$111-(21.4\times3+1)=45$$

The number of sectors remained unemployed in the reserve area, after (n+1) sectors are replaced can be calculated by subtracting the sum of the number of sectors which are employed by heavy revision sectors (21.4×3) and the number of sectors which are employed by the sector of which the order number is (n+1) (1) (This number 1 represents the number of sectors which are employed by the sector of which the order number is (n+1)) from the number of sectors remained unemployed in the reserve area (111).

iv. The assumed number of revisions for the sector of which the order number is (n+2), after (n+1) sectors have been replaced, is:

$$30000{:}X=3387{:}1339$$

Thus, X=11860

The number of revisions for a sector of which the order number is (n+2) at a time when the sector of which the order number is (n+1) reached the maximum limit0 of revisions (30000) can be assumed by a ratio of the number of revisions which have been applied so far for the sector of which the order number is (n+1), 3387, and the number of revisions which have been applied so far for the sector of which the order number is (n+2), 1339.

v. The number of sectors which are employed by replacement of heavy revision sectors before the sector of which the order number is (n+2) is replaced, is $$\{(30000-11860)\times21.4\times3\}/30000=39.$$

vi. The number of revisions applied to a sector of which the order number is (n+1), before the sector of which the order number is (n+2) is replaced, is assumed:

$$X{:}(30000-11860)=3387{:}1339$$

Thus, X=45885

Since the maximum allowable number of revisions is 30000, the sector of which the order number is (n+1) turns out to be replaced one time.

vii. The number of sectors remaining unemployed in the reserve area at the time the sector of which the order number is (n+2) is replaced, is:

$$45-39-1=0$$

Thus, the sector of which the order number is (n+1) will not be able to be replaced. The number of the ordinary sector which can not be shift to the reserve area, after the ordinary sectors are shifted to the reserve area turns out to be (n+2).

viii. The predicted number of revisions allowable within the life is:

$$30000-1339=28661$$

In the case where a limit is reached by replacement of an ordinary sector, the number of an ordinary sector which will not be able to be replaced or an ordinary sector of which the order number is "m", is calculated, and the present number of revisions applied to the ordinary sector of which the order number is "m" is subtracted from the maximum allowable number of revisions to obtain a predicted number of revisions allowable for a sector within the life.

As a result, the method for calculating the remaining life of a semiconductor disk device in accordance with the third embodiment of this invention is based on a concept that a potential replacement of a sector caused by an excess of the number of revisions is predicted, based on the result as of the time at which a command for calculating the remaining life is accepted, and the remaining life is predicted based on the predicted replacement, so that a user is allowed to enjoy an advantage in which he can learn the remaining life of a sector, in spite of a potential difference in usage caused by a difference of a system employed, in addition to that which stems from the second embodiment.

The foregoing description has clarified that the third embodiment of this invention has successfully provided a method for calculating the remaining life of a semiconductor disk device including a step for predicting the remaining number of revisions allowable for a sector within the life.

Although this invention has been described with reference to specific embodiments, this description is not meant to be construed in a limiting sense. Various modifications of the disclosed embodiments, as well as other embodiments of this invention, will be apparent to persons skilled in the art upon reference to the description of this invention. It is therefore contemplated that the appended claims will cover any such modifications or embodiments as fall within the true scope of this invention.

What is claimed is:

1. A method for calculating the remaining life of a semiconductor disk device having a memory means comprising a user's data storage area and a reserve area for being employed when said user's data storage area is full, comprising:

a step for calculating the number of sectors remained employable in said reserve area, a step for calculating the number of sectors which have been fully employed and the number of sectors which are under employment, said sectors being contained in said reserve area, a step for calculating a ratio of a sum of said number of sectors which have been fully employed and the number of sectors which are under employment and said number of sectors remained employable, and a step for calculating said remaining life of said semiconductor disk device employing said ratio.

2. A method for calculating the remaining life of a semiconductor disk device having a memory means comprising a user's data storage area and a reserve area for being employed when said user's data storage area is full, comprising:

a step for calculating the number of sectors remained employable in said reserve area, a step for lining up the entire sectors identified as under employment out or the sectors contained in said user's data storage, in the order of revisions previously applied thereto, for producing a sector arrangement, a step for selecting a sector of which the order number is a sum of said number of sectors remained employable in said reserve area and one, from said sector arrangement, a step for calculating the number of revisions of said sector of which the order number is a sum of said number of sectors remained employable in said reserve area and one, and a step for subtracting said number of revisions of said sector of which the order number is a sum of said number of sectors remained employable in said reserve area and one from the number of allowable number of revisions, for predicting said remaining life of said semiconductor disk device.

3. A method for calculating the remaining life of a semiconductor disk device having a memory means comprising a user's data storage area and a reserve area for being employed when said user's data storage area is full, comprising:

a step for lining up the entire sectors identified as under employment out of the sectors contained in said user's data storage, in the order of revisions previously applied thereto, for producing a sector arrangement, a step for selecting the top n sectors from said sector arrangement and for identifying each sector contained in said top n sectors as a heavy revision sector, a step for calculating the average revision number of said heavy revision sectors, a step for selecting the sectors of which the revision number is (n+1) and larger and for identifying each sector contained in said sectors of which the revision number is (n+1) and larger as an ordinary sector, a step for calculating the average revision number of said ordinary sectors, a step for calculating a ratio of said average revision number of said heavy revision sectors and said average revision number of said ordinary sectors, a step for calculating the number of sectors remained employable in said reserve area, a step for approving an idea that a limitation for revision will be reached by replacement of said ordinary sector, in the case where said number or sectors remains employable in said reserve area is identical to or larger than a product of said ratio and n, and for approving an idea that a limitation for revision will be reached by replacement of said heavy revision sector, in the case where said number of sectors remained employable in said reserve area is less than a product of said ratio and n, a step for subtracting the revision number of the ordinary sector from which a replacement to the reserve area will be impossible from the maximum allowable number of revisions, for predicting the remaining number for allowable revisions within the life of said semiconductor disk device, in the case where said idea that a limitation for revision will be reached by replacement of said ordinary sector have been approved, a step for calculating a ratio in which replacement is allowable by conducting a calculation employing a formula:

(number of sectors remained employable in said reserve area)/{the ratio (D) of the average revision number (B) of the top n sectors of the sector arrangement (A) and the average revision number (C) of the remaining sectors or the entire sectors removed by the top n sectors×n}, in the case where said idea that a limitation for revision will be reached by replacement of said number of sectors remained employable in said reserve area have been approved, and a step for subtracting the number of revisions applied to a sector of which the order number is (n+1) from a product of said maximum allowable number of revisions and said ratio (I) in which replacement is allowable, for predicting the remaining number for allowable revisions within the life of said semiconductor disk device.

4. A method for calculating the remaining life of a semiconductor disk device in accordance with claim 1, further comprising:

a step for checking if the revision number has exceeded the upper limitation, in response to receipt of a write command issued by a host computer and for setting a warning flag, and a step for checking if a warning flag has been set and for informing said host computer of the warning status.

5. A method for calculating the remaining life of a semiconductor disk device in accordance with claim 2, further comprising:

a step for checking if the revision number has exceeded the upper limitation, in response to receipt of a write command issued by a host computer and for setting a warning flag, and a step for checking if a warning flag has been set and for informing said host computer of the warning status.

6. A method for calculating the remaining life of a semiconductor disk device in accordance with claim 3, further comprising:

a step for checking if the revision number has exceeded the upper limitation, in response to receipt of a write command issued by a host computer and for setting a warning flag, and a step for checking if a warning flag has been set and for informing said host computer of the warning status.

* * * * *